United States Patent [19]

Walter

[11] 4,399,086

[45] Aug. 16, 1983

[54] PROCESS FOR MANUFACTURING FOAMED PLASTIC SHEETS

[75] Inventor: Juris Walter, Schaffhausen, Switzerland

[73] Assignee: Swiss Aluminium Ltd., Chippis, Switzerland

[21] Appl. No.: 236,638

[22] Filed: Feb. 20, 1981

[30] Foreign Application Priority Data

Mar. 4, 1980 [CH] Switzerland .................. 1697/80

[51] Int. Cl.³ .................. B29D 27/00; B29F 3/08
[52] U.S. Cl. .................. 264/45.5; 264/46.1; 264/48; 264/321; 264/DIG. 14; 425/325; 425/817 C
[58] Field of Search .......... 264/48, 51, 321, 45.5, 264/46.1, DIG. 14; 425/325, 817 C

[56] References Cited

U.S. PATENT DOCUMENTS

| | | | |
|---|---|---|---|
| 2,722,719 | 11/1955 | Alstadter | 264/321 X |
| 2,767,436 | 10/1956 | Noland et al. | 264/321 |
| 2,898,632 | 8/1959 | Irwin et al. | 264/48 |
| 3,123,656 | 3/1964 | Rochlin | 264/321 |
| 3,301,935 | 1/1967 | Stoeckhert | 264/48 X |
| 3,334,169 | 8/1967 | Erceg et al. | 264/51 X |
| 3,443,007 | 5/1969 | Hardy | 264/321 |
| 3,544,675 | 12/1970 | Belle Isle | 264/321 |
| 3,823,211 | 7/1974 | Colombo | 264/46.1 |
| 3,863,908 | 2/1975 | Charpentier | 264/45.5 |
| 3,870,451 | 3/1975 | Gokcen | 264/45.5 X |
| 3,874,981 | 4/1975 | Hayashi et al. | 264/46.1 X |
| 3,876,494 | 4/1975 | Ogawa et al. | 264/321 X |
| 3,879,505 | 4/1975 | Boutillier et al. | 264/45.5 X |
| 3,904,720 | 9/1975 | Sjostrand | 264/45.5 |
| 3,922,328 | 11/1975 | Johnson | 264/46.1 |
| 3,931,379 | 1/1976 | Cruson et al. | 264/45.5 |
| 3,933,959 | 1/1976 | Skochdopole et al. | 264/45.5 |
| 3,941,157 | 3/1976 | Barnett | 264/46.1 X |
| 4,192,839 | 3/1980 | Hayashi et al. | 264/45.5 |
| 4,279,848 | 7/1981 | Baxter et al. | 264/45.5 X |

FOREIGN PATENT DOCUMENTS

| | | |
|---|---|---|
| 1729076 | 2/1972 | Fed. Rep. of Germany . |
| 2613694 | 10/1977 | Fed. Rep. of Germany ..... 264/45.5 |
| 55-61437 | 5/1980 | Japan .................. 264/46.1 |

OTHER PUBLICATIONS

"The Encyclopedia of Patent Practice and Invention Management," Robert Calvert, Edt. New York, Reinhold, ©1964, p. 138.

Primary Examiner—Philip E. Anderson
Attorney, Agent, or Firm—Bachman and LaPointe

[57] ABSTRACT

The invention relates to a process for the continuous manufacture of foamed sheets of thermoplastic material having an extreme width to thickness ratio, small thickness tolerance, a uniform cell structure and, over the whole cross section on both sides of the sheet a thin, non-foamed outer skin. The plastic, which already contains the foaming agent is, on emerging from a wide-slit nozzle, allowed to foam freely without any restriction and cool. The sheet or strip formed in this manner is then heated locally at the surface and calibrated to final dimension.

18 Claims, 1 Drawing Figure

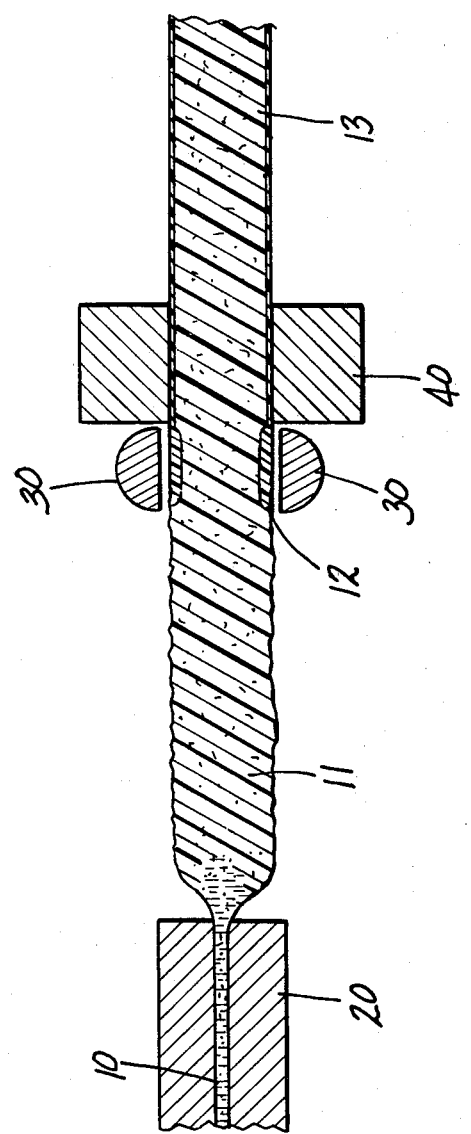

PROCESS FOR MANUFACTURING FOAMED PLASTIC SHEETS

BACKGROUND OF THE INVENTION

The present invention relates to a process for the continuous manufacture of foamed sheets of thermoplastic material, in particular polyvinylchloride, wherein the sheets are characterized by an extreme width to thickness ratio and a small thickness tolerance.

In the continuous production of foamed plastic sheets one differentiates basically between the method of "foaming outwards" and that of "foaming inwards".

The method of "foaming outwards" is the older, simpler method in which the thermoplastic plastic material, already containing the foaming agent, is extruded through wide, slit-shaped nozzles. The hot, soft, still-foaming extrusion material is led directly to an in-line calibrating facility where the process of expansion of the foam is stopped by the contact with the cooled surface.

The process of "foaming inwards" is described in German published patent application No. 17 29 076 for the Celuka process. In this process a specially designed metal core, a so-called torpedo, is employed in the extrusion die to produce a hollow space inside the extruded material, the outer surfaces of which are cooled by a closely following, in-line calibrating facility. This prevents the skin of the extruded material from foaming with the result that, initially, a hollow section is produced. The still hot inner zone which has a low viscosity foams towards the center until the space inside has been filled and counter pressure has been built up.

Both of the described processes can produce thin sheets but only in relatively small widths thereby considerably limiting the use of the sheets produced by said processes.

In the "foaming outwards" process the thickness of the skin formed depends on the intensity of cooling and pressure on the cooling surface. However, there is a certain minimum skin thickness which must be provided as, due to the cooling on the walls, the pressure in the cells falls and, when there is too little pressure inside, the cells collapse thereby affecting the quality of the surface. Also, in particular when vacuum calibration is employed, the skin has to provide a certain supporting function to prevent changes in structure and shape taking place due to frictional forces which are created as the sheet or strip is pulled through the calibrating unit.

Although this process does not require such expensive dies as the inward foaming process, and also allows a higher production rate, the quality of the foamed product is not completely satisfactory. Apart from the fact that the surface is not always smooth, the sheet varies greatly in thickness.

Although in the inward foaming process the density of the foamed material can be varied by appropriate choice of parameters such as torpedo shape and size, cooling rate and withdrawal rate, composition etc., it is unavoidable that the outer skin, consisting of non-foamed material, is relatively thick, and the foamed core layer contains pores widely varying in size, the pore diameter increasing across the section towards the middle of the core layer. Often the structure is nonhomogeneous, in particular in the cross section at the center line in the core where the two layers foaming from the outside towards the center meet. Not infrequently a laminar, linear texture, or even internal separation of the material can be observed at the center line. The resultant weakening of the core can be of disadvantage in applications where the sheet is subject to high mechanical stressing and rigidity is especially important, even though the rigidity of such sheet material depends essentially on the non-foamed outer skin. In applications where mechanical strength is of only minor importance e.g. for thermal insulation, the sheet material produced by the inwards foaming process is uneconomic as the relatively thick non-foamed outer skin contains a substantial amount of the plastic, which is therefore not efficiently used. A further, very important disadvantage of this process is, however, that wide, thin sheets—over ca. 1000 mm wide and less than 10 mm thick—cannot be produced by this process or only at great expense. There are two reasons for this. First, it is not possible to create the space in the die with a torpedo which has a very small height to width ratio, and secondly the outer skin cannot be produced thinner than a certain value due to the intensive cooling needed to create the hollow section during calibration. It is therefore not possible by the present state of the art to produce by this process plastic sheets which are less than 10 mm thick and 1000 mm or more wide. Also, when it is possible to manufacture extrusion dies to make sheets less than 10 mm thick and over 1000 mm wide, the production costs are so high that the economic use of such sheets is questionable.

In view of the disadvantages of the processes for manufacturing foamed plastic sheets described above, the inventor set himself the task of developing a process for the production of broad, thin foamed plastic sheets, in particular sheets made of polyvinylchloride having a homogeneous cell structure, dense surface, especially such which have a thin surface skin and at the same time only small variation in thickness.

SUMMARY OF THE INVENTION

The foregoing object is achieved by way of the present invention wherein the plastic, already containing a foaming agent, leaves the extruder via a wide-slit nozzle and foams, the foaming of the plastic mass being allowed to proceed to completion without hindrance that is no measures whatsoever are taken to limit the foaming action. In a cooling step the foamed sheet is then cooled uniformly over the whole cross section. The solid, cooled sheet is then heated locally by a heating device in such a manner that a thin layer near the surface of the sheet is again brought into the plastic, deformable state and the sheet is then passed through a calibrating facility. The production from the foamed plastic leaving the extrusion die to the finished sheet after calibration, takes place in a single in-line process.

BRIEF DESCRIPTION OF THE DRAWING

Advantages, features and details of the present invention will become apparent with the help of the accompanying drawing wherein FIG. 1 is a schematic representation illustrating the process of the present invention.

DETAILED DESCRIPTION

The drawing shows, schematically, the process according to the present invention. After emerging from the wide-slit nozzle 20 the plastic 10 already containing foaming agents forms a foamed plastic sheet 11 which features surface irregularities, irregular thickness and possibly even waves in the longitudinal direction. After cooling the sheet at least to a temperature at which structural changes no longer take place in the material, this sheet 11 is immediately, or briefly before entering the calibration facility 40, heated in a heating device 30 which is positioned perpendicular to the direction of movement of the strip 11, so that a zone 12 over the whole breadth of the strip 11 is brought into the viscous state required for calibration. The softened zone 12 is formed only in the vicinity of the surface of the sheet 11. Of fundamental importance for the invention is that the greater part of the sheet 11—at least 50% as viewed in cross section—and in particular the core of the sheet, remains in the cold and solid state. It has been found particularly advantageous if only approximately 10–30% of the cross section is softened for calibrating. After the sheet has been softened locally, it is fed to the calibrating device 40, preferably a vacuum calibrating device and calibrated to the desired thickness.

Sheets 13 manufactured by this process vary only slightly in thickness and have a smooth surface. Waves in the longitudinal direction present in sheet 11 are no longer visible in the end product 13, and there is no thickness difference at places which previously varied in this respect. The cell structure over the whole cross section is uniform right up close to the very thin non-foamed outer skin. Overall the pores are almost equal in size. There are no signs of texture effects or other non-homogeneities. Although conventional calibration devices are completely suitable for the process according to the invention, it is no longer necessary to have the calibrating zone as long as has been required with the processes used up to now. With the process according to the invention collapsing of the foamed material is avoided as only the outermost surface layer is brought into the plastic state. The removal of the heat in the plastic mass can be carried out over a much smaller cooling stretch than in the conventional processes in which the heat in the extruded material distributed over the whole cross section of the sheet has to be removed at least to such an extent over the whole calibrating zone that the foamed mass does not collapse in any region; this is in fact almost the whole heat content of the sheet, therefore long cooling zones and, due to the poor thermal conductivity of the foamed material, long times are necessary for conventional processes, especially for the core zone.

The calibration represents a slow and therefore for production rate-limiting step in all processes used up to now to manufacture uniformly dimensioned, foamed sheets or the like. In the process according to the invention, however, the calibration step involves only the surface of the sheet. This means that the sheet or strip can run much faster through the calibrating device, which markedly increases the production capacity per unit time.

With the process according to the invention it has been found that when employing simple wide-slit nozzles 20 without any kind of additional components, sheets ≧1000 mm broad and less than 10 mm thick can be manufactured without difficulty. In particular, especially high production rates were attainable at a sheet width of 1220 mm and thickness of 3–6 mm using wide-slit nozzles 20 with an outlet zone which was 1300 mm wide and 0.3–4 mm high. Without making any constructional changes wide-slit nozzles 20 beyond these dimensions, up to approximately 2000 mm wide, preferably 1300 to 1700 mm, can be employed, at the same time with the height of the slit opening being variable between 0.3 and 6 mm.

Particularly suitable heating devices 30 are hot-air and/or infra-red beam devices. The combination of these two heating devices has been found to be advantageous in particular in the starting-up period when using equipment employing the process according to the invention: A region of the sheet perpendicular to the direction of movement is heated by hot air near the calibration facility and this pre-heated region then heated by the infra-red heater just before the calibration facility to give that region the viscosity needed for calibrating.

The degree of surface heating required to bring about the desired viscosity in the plastic region depends on the material and machines employed and must be determined by a series of trials.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the continuous production of wide, thin, foamed thermoplastic sheets characterized by a uniform cell structure and a thin non-foamed outer skin comprising feeding a thermoplastic material containing a foaming agent through the nozzle of an extruder, allowing the extruded thermoplastic to foam freely in an unconfined space so as to allow for substantially complete foaming, cooling the freely substantially completely foamed extruded thermoplastic to a non-formable solid state, selectively heating the surface of the cooled freely substantially completely foamed extruded thermoplastic so that the outer zone of the freely foamed extruded thermoplastic is in a formable state while the core of the freely foamed extruded thermoplastic remains in a non-formable solid state and passing said selectively heated freely foamed extruded thermoplastic through a calibrating device so as to produce a foamed thermoplastic sheet of desired thickness having a thin non-foamed outer skin.

2. A process according to claim 1 wherein the outer zone comprises not more than 50% of the cross section of the cooled free foamed extruded thermoplastic.

3. A process according to claim 1 wherein the outer zone comprises from about 10–30% of the cross section of the cooled free foamed extruded thermoplastic.

4. A process according to claim 1 including the steps of providing a wide-slit nozzle for the extruder having a width of from about 1,000 mm to 2,000 mm and a height of from about 0.3 mm to 6.0 mm.

5. A process according to claim 1 including the steps of providing a wide-slit nozzle for the extruder having a width of from about 1,300 mm to 1,700 mm and a height of from about 0.3 mm to 4.0 mm.

6. A process for the continuous production of wide, thin, foamed thermoplastic sheets characterized by a uniform cell structure and a thin non-foamed outer skin comprising providing an extruder having a wide-slit nozzle, feeding a thermoplastic material containing a foaming agent through said wide-slit nozzle of said extruder, allowing the extruded thermoplastic to foam freely in an unconfined space so as to allow for substantially complete foaming and cooling said freely foamed extruded thermoplastic in said unconfined space to a non-formable solid state, providing heating means for selectively heating the surface of the cooled freely foamed extruded thermoplastic so that the outer zone of the freely foamed extruded thermoplastic is in a formable state while the core of the freely foamed extruded thermoplastic remains in a non-formable state, providing a calibrating means for calibrating the freely foamed extruded thermoplastic to final thickness and passing said selectively heated freely foamed extruded thermoplastic through said calibrating means so as to produce a foamed thermoplastic sheet of desired thickness having a thin non-foamed outer skin.

7. A process according to claim 6 including the steps of locating said calibrating means immediately downstream of said heating means.

8. A process according to claim 6 wherein the outer zone comprises not more than 50% of the cross section of the cooled free foamed extruded thermoplastic.

9. A process according to claim 6 wherein the outer zone comprises from about 10–30% of the cross section of the cooled free foamed extruded thermoplastic.

10. A process according to claim 6 including the steps of providing a wide-slit nozzle for the extruder having a width of from about 1,000 mm to 2,000 mm and a height of from about 0.3 mm to 6.0 mm.

11. A process according to claim 6 including the steps of providing a wide-slit nozzle for the extruder having a width of from about 1,300 mm to 1,700 mm and a height of from about 0.3 mm to 4.0 mm.

12. A process according to claim 6 including the steps of providing a hot air heater.

13. A process according to claim 6 including the steps of providing an infra-red radiating heater.

14. An extrusion apparatus for use in the continuous production of wide, thin, foamed thermoplastic sheets characterized by a uniform cell structure and a thin non-foamed outer skin comprising, in combination, a plastic extruder having a wide-slit nozzle, means defining an unconfined space adjacent to and downstream of said wide-slit nozzle for receiving the extruded thermoplastic material from said wide-slit nozzle wherein said thermoplastic material substantially completely foams and thereafter is cooled to a non-formable solid state, heating means adjacent to and downstream of said means defining an unconfined space for selectively heating the surface of the foamed extruded thermoplastic material and calibrating means downstream of said heating means for calibrating the foamed extruded thermoplastic material to final thickness so as to produce a foamed thermoplastic sheet of desired thickness having a thin non-foamed outer skin.

15. An extrusion apparatus according to claim 14 wherein said wide-slit nozzle has a width of from about 1,000 mm to 2,000 mm and a height of from about 0.3 mm to 6.0 mm.

16. An extrusion apparatus according to claim 14 wherein said wide-slit nozzle has a width of from about 1,300 mm to 1,700 mm and a height of from about 0.3 mm to 4.0 mm.

17. An extrusion apparatus according to claim 14 wherein said heating means is a hot air heater.

18. An extrusion apparatus according to claim 14 wherein said heating means is an infra-red radiating heater.

* * * * *